(12) United States Patent
Larribeau et al.

(10) Patent No.: US 6,421,328 B1
(45) Date of Patent: Jul. 16, 2002

(54) NEIGHBORHOOD LIST ASSIMILATION FOR CELL-BASED MICROSYSTEM

(75) Inventors: Scott Larribeau, San Mateo; Luong Duy Duong, San Jose, both of CA (US)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/086,299

(22) Filed: May 28, 1998

Related U.S. Application Data

(60) Provisional application No. 60/057,525, filed on Sep. 4, 1997, and provisional application No. 60/068,843, filed on Dec. 24, 1997.

(51) Int. Cl.[7] .................................................. H04Q 7/00
(52) U.S. Cl. ........................ 370/329; 370/438; 370/343; 455/434; 455/444; 455/450; 455/511
(58) Field of Search ................................. 370/329, 331, 370/332, 330, 333, 335, 338, 343, 431; 455/414, 438, 440, 442, 436, 444, 447, 63, 445, 434, 450, 509, 511

(56) References Cited

U.S. PATENT DOCUMENTS

| | | | | |
|---|---|---|---|---|
| 4,771,448 A | * | 9/1988 | Koohgoli et al. | 379/60 |
| 5,499,386 A | * | 3/1996 | Karlsson | 455/33.2 |
| 5,537,610 A | * | 7/1996 | Mauger et al. | 379/58 |
| 5,673,307 A | * | 9/1997 | Holland et al. | 379/60 |
| 5,717,688 A | * | 2/1998 | Belanger et al. | 370/331 |
| 5,761,623 A | * | 6/1998 | Lupien et al. | 455/552 |
| 5,828,661 A | * | 10/1998 | Weaver, Jr. et al. | 370/331 |
| 5,946,621 A | * | 8/1999 | Chheda et al. | 455/440 |
| 5,953,661 A | * | 9/1999 | Schwinghammer et al. | 455/423 |
| 5,960,347 A | * | 9/1999 | Ozluturk | 455/442 |
| 5,982,758 A | * | 11/1999 | Hamdy | 370/331 |
| 5,987,332 A | * | 11/1999 | Gettleman et al. | |
| 5,999,522 A | * | 12/1999 | Rohani | 370/331 |
| 6,108,322 A | * | 8/2000 | Kotzin et al. | 370/333 |

FOREIGN PATENT DOCUMENTS

| | | | | |
|---|---|---|---|---|
| WO | WO 96/31075 | * | 10/1996 | H04Q/7/38 |

\* cited by examiner

Primary Examiner—Seema S. Rao

(57) ABSTRACT

A method for assembling a microsystem neighbor list that defines control channel usage within a common operational band used by the microsystem, the overlying macrosystem and any computer microsystems. Such a method can be implemented by a frequency planning controller within the microsystem, the microsystem itself or, in the case of the computer-controlled microsystem, in a computer program product defining such method. Assembly of the microsystem neighbor list includes defining preferred and non-preferred members, wherein the preferred members of the macrosystem neighbor list include at least one control channel identified within the common operational band which determined to be available for use by the microsystem. The non-preferred members of the microsystem neighbor list will include control channels being used by adjacent macrocells of the overlying microsystem, or any competing microsystems. The assembled microsystem neighbor list may be broadcast throughout the service area of the microsystem in order to apprise all registered mobiles of active/backup control channel information (thereby improving control channel allocation flexibility control channel recovery operations), as well as control channel information for the competing Microsystems or adjacent macrocells (to improve switchover to such systems when requested by a mobile operator). Other disclosed aspects include ongoing maintenance through verification of preferred and non-preferred members of the macrosystem neighbor list.

18 Claims, 10 Drawing Sheets

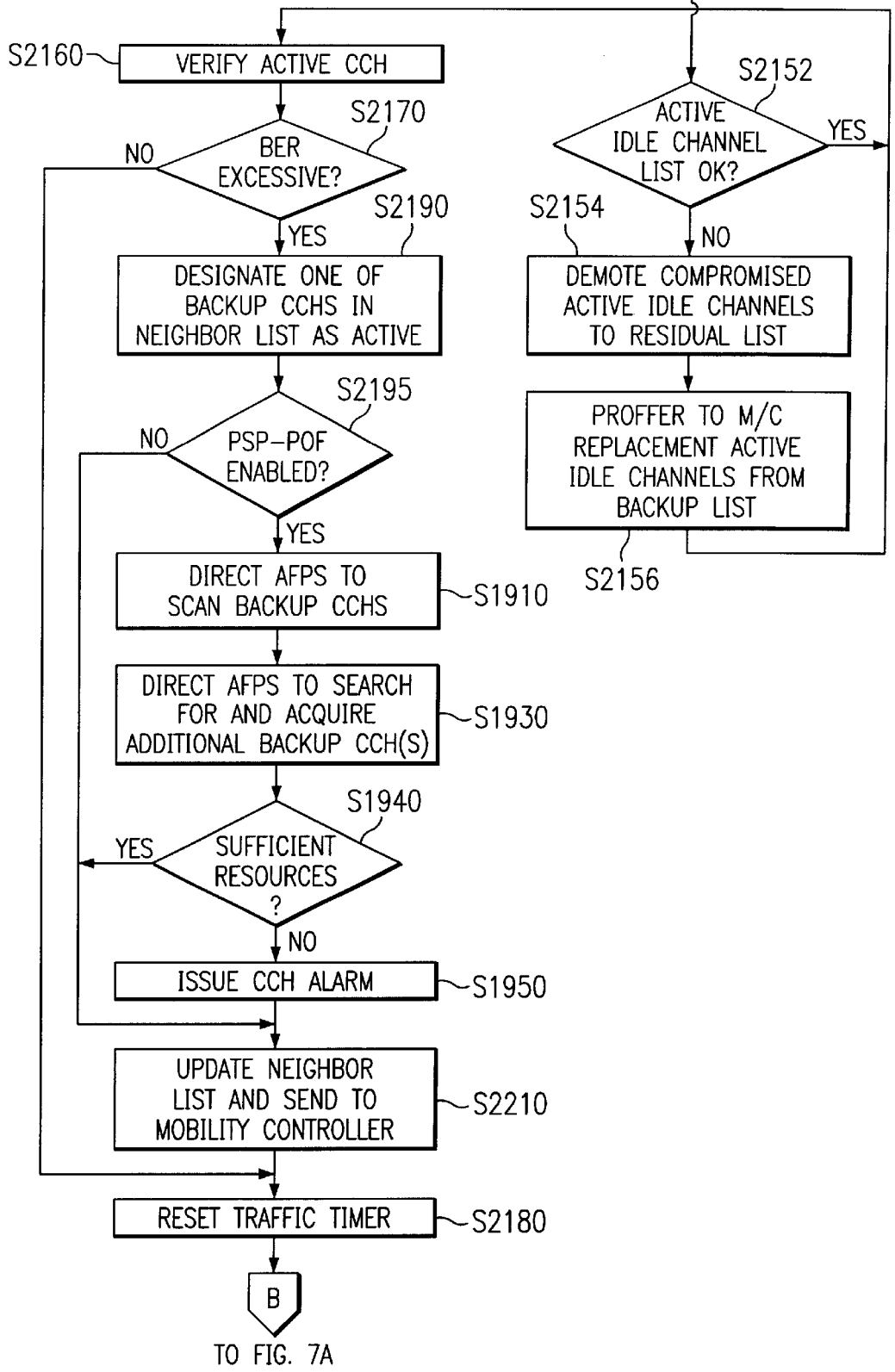

NEIGHBOR LIST

| | | |
|---|---|---|
| NON-PREFERRED | 1015 | |
| NON-PREFERRED | 900 | |
| PREFERRED { REGULAR | A | ACTIVE |
| REGULAR | B | |
| REGULAR | C | BACKUP |
| REGULAR | D | |

*FIG. 8A*

| PSP | POF |
|---|---|
| 1015 | A |
| 900 | B |
| | C |
| | D |

*FIG. 8B*

NEIGHBOR LIST

| | | |
|---|---|---|
| NON-PREFERRED | 1015 | |
| NON-PREFERRED | 900 | |
| PREFERRED { ~~REGULAR~~ | ~~A~~ | ~~ACTIVE~~ |
| REGULAR | B | |
| REGULAR | C | BACKUP |
| REGULAR | D | |

*FIG. 9*

NEIGHBOR LIST

| | | |
|---|---|---|
| NON-PREFERRED | 1015 | |
| NON-PREFERRED | 900 | |
| PREFERRED { REGULAR | B | ACTIVE |
| REGULAR | C | |
| REGULAR | D | BACKUP |
| REGULAR | E | |

*FIG. 10A*

| PSP | POF |
|---|---|
| 1015 | B |
| 900 | C |
| | D |
| | E |

*FIG. 10B*

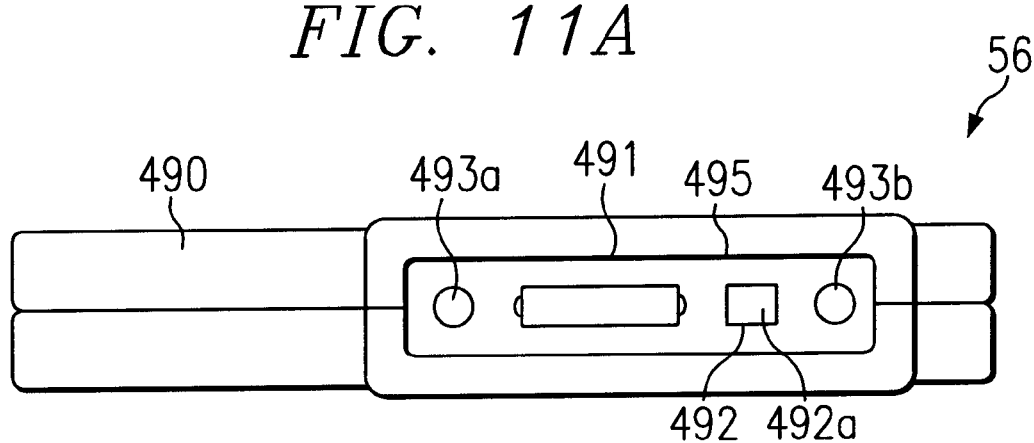
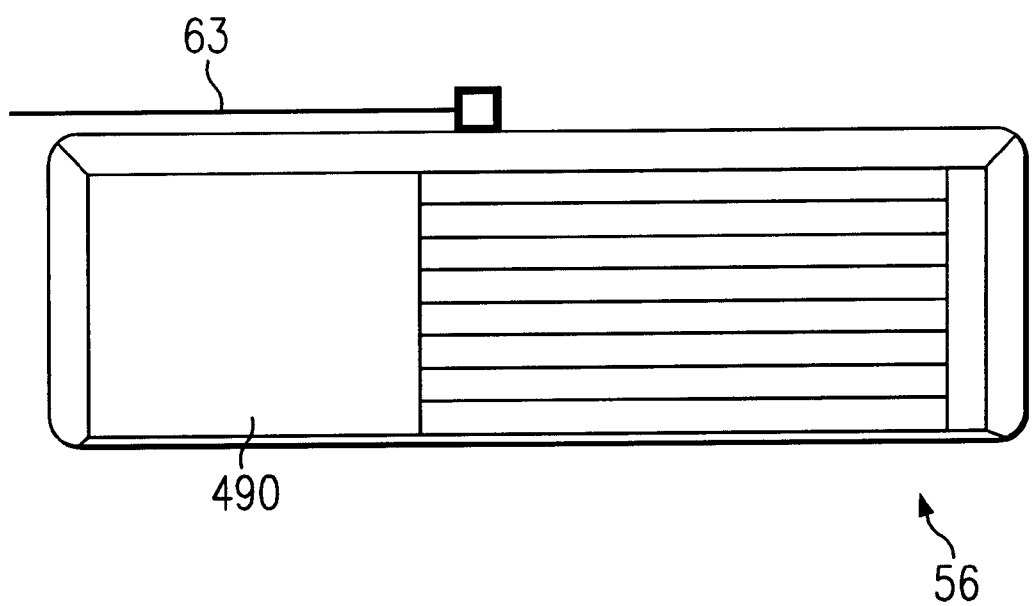

NEIGHBORHOOD LIST ASSIMILATION FOR CELL-BASED MICROSYSTEM

CROSS REFERENCE TO RELATED APPLICATIONS

This application claims right of priority under 35 USC §119e from U.S. Provisional Application Serial No. 60/057, 525, filed Sep. 4, 1997 in the name of Aditya Bhasin, Scott Larribeau, Stephen Roy, Jagdish Patel, William Cheal, and Luong Duong, and U.S. Provisional Application Serial No. 60/068,843, filed Dec. 24, 1997 in the name of Jagdish Patel, Aditya Bhasin, William Cheal, Scott Larribeau, and Luong Duong.

This application is also related to co-pending U.S. Application Ser. No. 09/086,300, in the name of Jagdish Patel, Aditya Bhasin and William Cheal and entitled "Automatic Frequency Planning Scanner, System and Method for a Microcellular System", filed on even date herewith which is incorporated herein fully by reference now abandoned.

FIELD OF THE INVENTION

This invention relates to microcellular radio transmission systems, and is particularly directed to dynamic radio frequency scanning, planning, and channel allocation for microcellular systems coexisting in a macrocellular environment.

DESCRIPTION OF THE RELATED ART

The last decade has witnessed an explosion in the deployment of analog and digital cellular radio communication systems across the globe. Such systems provide spectrum efficient, low-power wireless communication between mobile or fixed communications terminals ("mobiles") and fixed radio transceivers ("base stations") dispersed throughout the service area of a macro cellular system ("macrosystem"). Typically, each macrosystem base station maintains a permanent communications link with a mobile telephone exchange (MTX), which is responsible for wireless call processing as well as interfacing the mobiles to the Public Switched Telephone Network ("PSTN").

In narrowband cellular macrosystems, such as defined in the IS-136, IS-54B, and GSM standards, RF spectrum efficiency is realized through geographic distribution and reuse of a finite number of signal-bearing carrier frequencies within the macrosystem service area. Conventionally, this is accomplished through geographically segmenting the service area into a number of macrocells, each containing at least one base station. Within each macrocell, wireless communications are established between mobiles within the macrocell and the macrocell base station(s) using only a portion of the radio frequency spectrum or operational band allocated to the macrosystem. In so doing, each macrocell may be statically or dynamically allocated a subset from the pool of more than 400 defined frequency pairs within the macrosystem's operational band. Adjacent macrocells are assigned non-overlapping frequency channels to maximize traffic loading without producing co-channel interference. However, at or beyond the reuse distance of a given macrocell (which is dictated by such factors as base station/mobile transmitter power and receiver sensitivity specifications, macrocell size, and terrain), a set of partially or fully overlapping frequency pairs may be allocated.

Narrowband cellular radio is inherently scaleable, and has proven to be a reliable, wireless communications system offering relatively low fixed-end and infrastructure costs when smaller geographical areas are to be serviced. Network communications companies have also recognized the market need for private wireless communications having network functions tailored to the specific requirements of individual businesses, government, and private institutions. Hence, it has become popular to deploy a private microcellular radio communication system or "microsystem" within the macrosystem service area. Such a microsystem will typically be integrated into a private branch exchange ("PBX") as part of a private communications network and can be conveniently deployed within an office building, campus or worksite to enable wireless communications among the occupants thereof. Potentially each subscribing mobile positioned within the microsystem's service area can register with this private network through the microsystem's base station(s) and emulate a desktop terminal served by the PBX.

Representative private microcellular networks have been developed by Northern Telecom Limited, the assignee of the present invention. See, for example, U.S. Pat. Nos. 4,771, 448 to Koohgoli, et al. and 5,537,610 to Mauger, et at One of the hallmarks of these and other known microsystem approaches is the ability for both the microsystem and macrosystem to utilize the same mobile unit. Another is the nearly seamless handoff operation a subscribing mobile undergoes when moving from the macrosystem to the microsystem (such as when a mobile's user walks into the office building) and vice versa. Yet another feature is the ability for the mobile to remain registered on the macrosystem and potentially make and receive macrosystem calls while in the microsystem's coverage area but not registered on this microsystem.

To accommodate these features while conserving scarce frequency spectrum resources, a microsystem must be able to re-use some of the traffic and control frequencies allocated to the overlying macrosystem. But, in order for the microsystem to "peacefully" coexist with the macrosystem, the microsystem must be able to quickly obtain and relinquish frequency resources without inducing co-channel interference or otherwise disrupting macrosystem operations. Traditionally, macrosystem spectrum resources were statically assigned to the macrocells, and so microsystem planners could routinely predict and reserve frequencies allocated to the macrosystem but left unassigned to the macrocell(s) in which the microsystem was located. However, as macrosystem traffic demands increasingly strain capacity, macrosystem planners have responded by all-too-frequently adapting macrocell frequency allocations to varying use patterns, thereby making cooperative microsystem resource planning difficult, if not impossible to implement.

In response, an automatic frequency allocation system has been proposed in laid-open PCT application WO 96/31075. The disclosed system will enable the microsystem to scan the uplink subrange of frequencies allocated to the overlying macrosystem through periodically placing an idle microcell base station transceiver in a locate receiver mode. Once the frequency subrange is scanned, measurement data associated with each scanned frequency is evaluated by the microsystem and a set of available frequencies is determined for use in microsystem communications.

However, in this system, no provision has been made to efficiently apprise registered mobiles within range of the microsystem of backup control channel information as well as control information for the overlying cells of the macrosystem and any competing Microsystems, particularly when such mobiles are being actively serviced by the microsystem. This is so even though the microsystem is attempting to cooperatively share a common operational band with the overlying macrosystem and any competing microsystems.

Therefore, it would be desirable for a microsystem to manage such control information at a local level which can be made conveniently accessible to all registered mobiles being serviced by the microsystem. Furthermore, it would be advantageous if, in so doing, the microsystem would be able to exploit yet remain compatible with existing planning information issued by the overlying macrosystem, including, but not limited to macrosystem neighbor list communications. Finally, it would be advantageous if microsystem-centric control channel information could be presented and assimilated by the registered mobiles without substantial modification to the mobiles themselves.

SUMMARY OF THE INVENTION

In light of the above shortcomings and desires, the present invention is directed to a method for assembling a microsystem neighbor list to define control channel usage within the operational band being used by the microsystem, the overlying macrosystem, and any competing Microsystems. The present invention is also directed to a frequency planning controller and microsystem utilizing this method, as well as a computer program product defining the same.

Preferably, assembly of the microsystem neighbor list includes defining preferred and non-preferred members. In the below-described embodiments, the preferred member(s) of the microsystem neighbor list will include at least one control channel defined within the common operational band which is determined to be available for use by the microsystem. In the typical case, more than one preferred member will be defined in order to provide backup control channels should interference be detected.

According to one embodiment of the invention, potential preferred members (and suitable control channel candidates) of the microsystem are identified through scanning a set of control channel candidates to obtain measured RSSI signal characteristics for each, comparing the measured signal strengths against a tolerance threshold, and filtering out those control channel candidates whose measured RSSI characteristics indicate a likelihood of use by the overlying macrosystem or a competing microsystem. Thus, those control channel candidates who exhibit sufficiently clean signal characteristics will be chosen to be preferred members of the microsystem neighbor list, and consequently, as active/backup control channels for the microsystem.

The aforementioned set of control channel candidates may include pre-designated candidates, or can also include any frequency pair defined within the operational band.

Further, preferably, the non-preferred members of the microsystem neighbor list will include the control channels being used by adjacent macrocells of the overlying macrosystem, or even competing Microsystems. This information may be conveniently obtained by acquiring the system-wide macrosystem or cell-specific macrocell neighbor list issued by the overlying macrosystem. In such case, the preferred members of the macrosystem or macrocell neighbor list will become the non-preferred members of the microsystem neighbor list.

According to the present invention, the so-assembled microsystem neighbor list comprising preferred and non-preferred members may be broadcast throughout the service area of the microsystem in order to apprise all registered mobiles of active/backup control channel information for the microsystem, thereby improving control channel allocation flexibility and control channel recovery operations. The broadcast microsystem neighbor list also provides control channel information for competing Microsystems (if any) or adjacent macrocells, thereby improving switch-over to such systems when desired by the mobile operator.

Though not required, it is advantageous to convert the assembled microsystem neighbor list into a PSP-POF compatible table for transmission to the registered mobiles. Doing so ensures proper recognition of the control channel information for both the microsystem as PSP entries and the overlying macrosystem/competing microsystem(s) as POF entries, at least from the microsystem's perspective, without substantive modification to the PSP-POF handling routines or logic contained on the registered mobiles. Of course, in such a configuration, use of PSP-POF compatible mobiles (such as those specified by the IS-136 TDMA cellular communications standard) is believed required.

An additional aspect of the invention is maintainability of the microsystem neighbor list after assembly. The preferred member(s), particularly the active control channel, can be routinely checked to see if co-channel interference has been perceived thereon, and if so, such preferred member(s) can be removed from the neighbor list and replacement member(s) can be acquired. Furthermore, preferably the non-preferred members can be periodically verified to keep microsystem neighbor list data reasonably fresh and accurate of control channel use within the common operational band.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features of the invention, as well as the invention itself may be best understood with reference to the following drawings, in which like reference numbers indicate like parts, to which:

FIGS. 7A–7C are flow charts illustrating ongoing frequency monitoring performed by the AFP controller shown in FIG. 5;

FIG. 8A is a diagram of a sample neighbor list constructed according to the embodiment shown in FIG. 2;

FIG. 8B is a diagram of a sample PSP/POF table corresponding to the neighbor list of FIG. 8A;

FIG. 9 illustrates the neighbor list of FIG. 8A respectively undergoing neighbor list modification according to the embodiment of FIG. 2;

FIGS. 10A and 10B illustrate the neighbor list and PSP/POF tables of FIG. 9 after the neighbor list modification according to the embodiment of FIG. 2 is complete; and FIGS. 11A and 11B are elevation and plan views respectively of the automatic frequency planning scanner shown in FIG. 3.

DETAILED DESCRIPTION OF THE PREFERRED EMBODIMENTS

Figure 1:
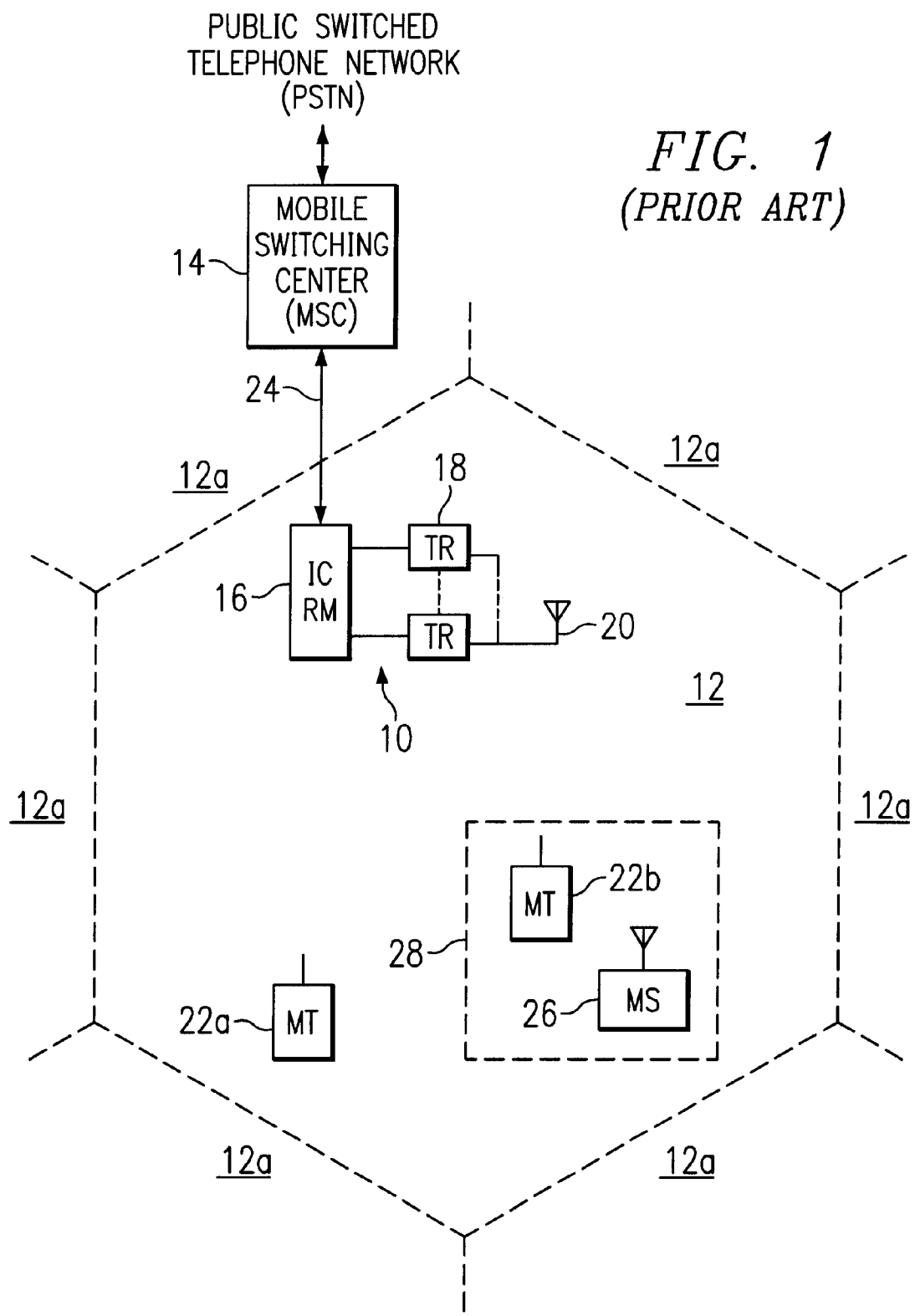
FIG. 1 schematically illustrates a cellular radio communications macrosystem including a microsystem as is known in the art.

Referring to FIG. 1, this figure schematically and generally illustrates a dual mode macrosystem which includes cell-site equipment 10 in a geographic cell 12. Similar equipment, not shown in the figure, is provided in each of adjacent macrocells 12a within a geographic area served by a mobile switching center (MSC) 14, which provides connections to the public switched telephone network (PSTN). The macrocells 12 and 12a are represented schematically in FIG. 1 by broken lines indicating adjacent non-overlapping hexagonal areas of substantially equal size, but it should be recognized that these cells 12 and 12a really have differing shapes and sizes with indefinite and overlapping borders as determined by local signal conditions and terrain.

The cell-site equipment 10 in each macrocell 12 and 12a includes an integrated cell-site remote module MSC and base station (ICRM) 16 and a plurality of radio transceivers (TRs) 18 having an antenna arrangement 20 for two-way radio communications with mobile telephone terminals (MTs) 22a and 22b. Each ICRM has a wired connection 24 for multiplexed communication with the MSC 14.

FIG. 1 also schematically and generally represents a microsystem 26 which provides wireless overlay communications within a geographical area 28 which may be, for example, a building or campus disposed within the macrocell 12. The microsystem 26 according to the preferred and alternative embodiments of the invention will be described in greater detail hereinbelow. Although only one microsystem 26 is shown in FIG. 1, there may be many such Microsystems in one or more of the cells 12 and 12a, each with its own geographic service area 28.

As the arrangement and operation of the cell-site equipment 10 and the MSC 14 are well-known in the art of cellular telephone systems, they are not further described herein.

Figure 2:
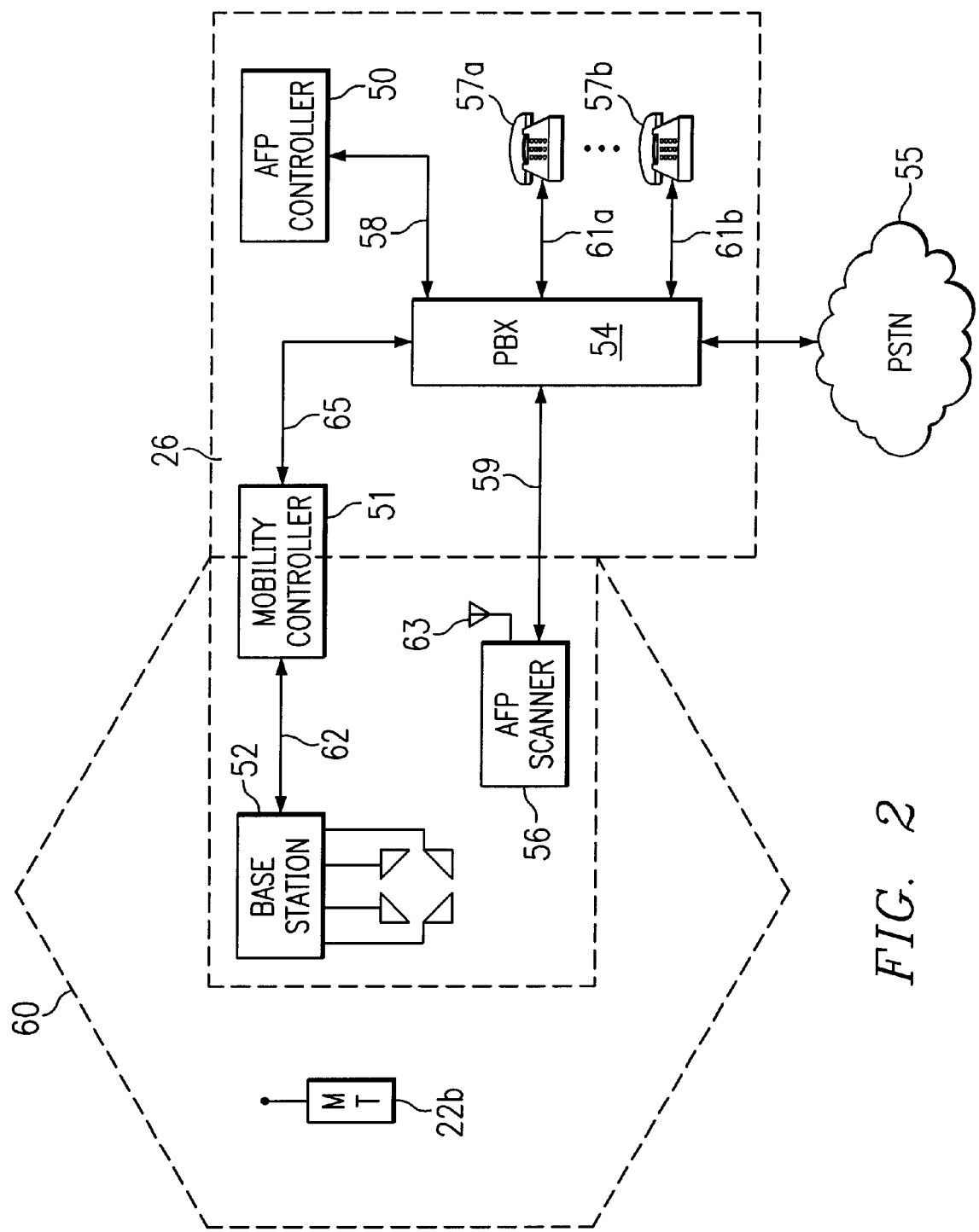
FIG. 2 schematically illustrates a microsystem according to a first embodiment of the invention.

FIG. 2 is a more detailed schematic of the microsystem 26 according to the first embodiment of the present invention. As shown therein, microsystem 26 has at least one base station 52 including transceiver resources for servicing at least one registered mobile terminal 22b within a microcell 60. One or more of these microcells 60 collectively constitute the geographic service area 28 of the microsystem 26.

In this embodiment, the base station 52 is coupled to mobility controller 51 via bi-directional communications link 62. In turn, mobility controller 51 communicates with switched private branch exchange communications system (PBX) 54 through communications link 65.

Here, PBX 54 maintains a wired connection to the PSTN 55 as well as switched digital communications links 61a and 61b interconnecting PBX 54 to a number of conventional fixed digital telephone terminals 57a and 57b. PBX 54 handles routine call processing and switching responsibilities among these terminals 57a and 57b. PBX 54 also handles wireline control, and protocol-independent wireless call processing of calls routed through and handled by the mobility controller 51 via the communications link 65.

Preferably, PBX 54 comprises a Meridian M1 PABX available from Northern Telecom, Ltd. of Montreal Canada.

In so doing, switched data and voice information carried over twisted pair lines 61a, 61b and 59 as shown in FIG. 2 preferably follow the Time Compression Multiplexing (TCM) signaling protocol well known in the art, and that AFP scanner 56 and fixed telephone sets 57a and 57b include appropriate TCM interfacing logic and circuitry and communicate over a TCM loop 59 as is shown in FIG. 2. However, it should become readily apparent to those ordinarily skilled in the art that the particular PBX system or signaling format is not particularly germane to the teachings of the present invention, as long as bi-directional data communication, including frequency monitoring requests and responses detailed hereinbelow, can be accommodated between the AFP scanner 56 and the AFP controller 50.

Mobility controller 51 provides conventional OA&M (operations, administration & maintenance) support for the microsystem 26, along with mobility management for establishing and maintaining communications between the mobile terminal(s) 22b registered in the microsystem 26 and the PBX 54. Further, as will be discussed in more detail hereinbelow with respect to automatic frequency planning, the mobility controller 51 may serve as a data repository for active-assigned channel and neighbor list information for the microcell 60 it is assigned to handle.

As explained above, the microsystem 26 scavenges for traffic and control frequency channels which have been allocated to the overlying macrosystem(s) but are not being used in the vicinity of the microsystem 26. For example, within the geographic service area 28 of the microsystem 26 located within macrocell 12, many of the frequency channels which are in use by the macrosystem in the adjacent macrocells 12a may be clean enough (exhibit sufficiently small signal strengths) that they can be re-used by the microsystem 26 for broadcasting microsystem-specific digital or analog information within service area 28 without interfering with the macrosystem.

Determining which frequency channels may be used in this manner requires not only an initial determination of the signal strengths on the frequency channels, but also ongoing monitoring of the signal strengths in view of possibly rapid changes of signal conditions and frequency use by the macrosystem over time. Ongoing monitoring will also take into account actual reuse of the traffic and control channels by the microsystem 26 itself, as well as the possibility of reuse of the same frequency channels by other microsystems within the macrosystem (e.g. Microsystems deployed in adjacent buildings within the same macrosystem cell 12).

According to the present embodiment, initial scavenging and ongoing monitoring operations of the present invention may be carried out by an Automatic Frequency Planning scanner (AFP scanner) 56—Automatic Frequency Planning controller (AFP controller) 50 tandem. The AFP controller 50 is primarily responsible for building and maintaining the traffic channel backup and residual lists used in traffic channel allocation within the microsystem 26. The AFP controller 50 also builds and maintains a list of preferred and non-preferred neighbor sites (neighboring microcells and/or macrocells) which also operate within the same or overlapping operational band. Configuration of the AFP controller 50 and detailed functionality thereof will be explained in greater detail below with reference to FIGS. 5, 6A–6C, 7A–7C and the example neighbor list IS-136 Public Service Profile—Private Operating Frequency (PSP-POF) tables shown in FIGS. 8A–10B.

The AFP scanner 56 functions generally as a programmable frequency characteristics receiver. Preferably, as shown in FIG. 2, at the least the RF antenna 63 of the AFP scanner 56 will be physically positioned within the microcell 60 in order to capture signal information for traffic and control channel candidates as they are perceived within that cell. From this location, the AFP scanner 56 periodically samples a set of the forward and reverse traffic (or up-link/down-link) channels requested by the AFP controller 50, and forwards channel characteristic information associated with each sampled channel (such as measured Receive Signal Strength Indication or "RSSI" values) to the AFP Controller 50 for analysis. Further, upon request or direction from the AFP controller 50, the AFP scanner 56 will monitor signal quality of one or more selected members of the neighbor list, including the active and back up microcell control channels specified for the microcell 60 as well as control channels in use in macrocells 12 and 12a of the overlying macrosystem. When monitoring of the requested channel(s) is complete, the AFP scanner 56 forwards measured bit error rate ("BER") information of these channels to the AFP controller 50 for subsequent analysis and neighbor list processing according to the present invention. A more detailed description of the AFP scanner 56 will be presented below with reference to FIGS. 3–5.

In the embodiment shown in FIG. 2, the automatic frequency planning scanner 56 exists as a separate unit coupled to an internal switching unit within PBX 54 through bi-directional TCM loop 59 or similar communications link. This configuration is preferable to ease remote installation of the AFP scanner within the microcell 60, as well as simplify communications between the AFP scanner and other components of the microsystem, including the PBX 54 and the AFP controller 50, since the AFP scanner can be configured to appear to these components as a digital telephone extension. Thus, for example, when the aforementioned channel sampling and measuring activities are requested by the AFP controller 50, the AFP controller 50 only needs to request the PBX to establish a connection to the PBX extension number assigned to the AFP scanner 56. Thereafter, the switching unit PBX 54 sets up the desired communications link through conventional call processing and exchange switching techniques.

Furthermore, in this embodiment, TCM loop 59 and the links 61a and 61b comprise twisted pair cabling capable of bi-directional transit of TCM signaling and coded data as is well-known in the art. Moreover, the TCM loop 59 is capable of delivering operating power to the AFP scanner 56 in the same manner as links 61a and 61b do for their respective attached terminals 57a and 57b.

Although not shown in the figure, it should also become readily apparent to those ordinarily skilled in the art that the AFP scanner 56 and/or the AFP controller 50 can be physically integrated into the PBX 54 in the form of an expansion card or similar unit as long as the RF antenna 63 of the AFP scanner is positioned within the geographical boundaries of the microcell.

Figure 3:
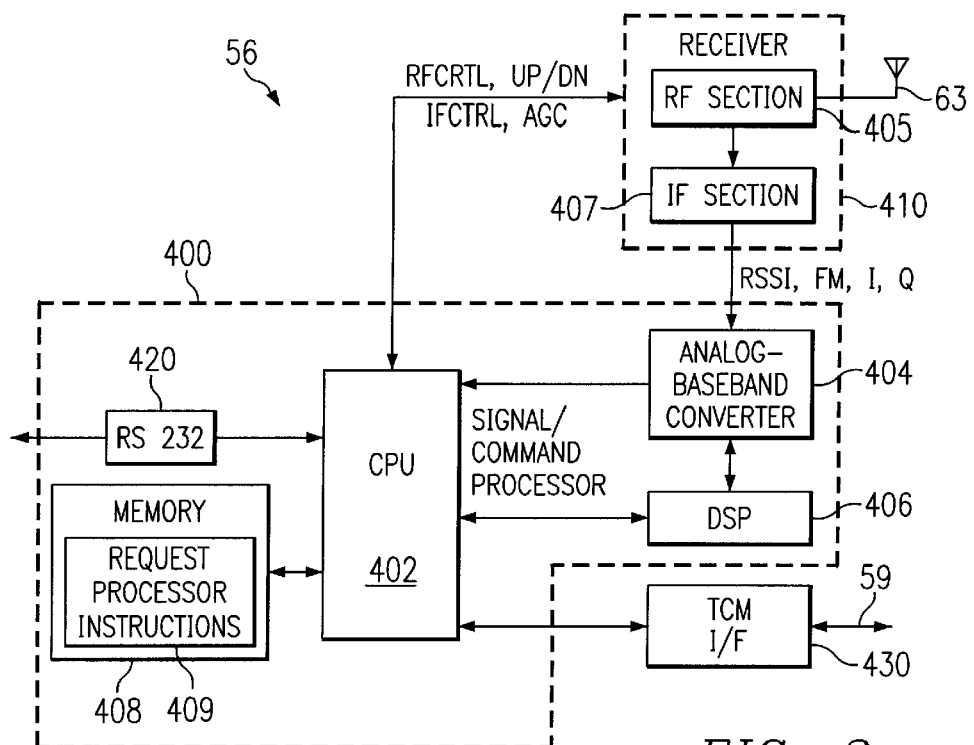
FIG. 3 is a more detailed block diagram of the automatic frequency planning scanner of the embodiment shown in FIG. 2.

FIG. 3 is a more detailed schematic block diagram of the automatic frequency planning scanner 56 according to the first embodiment of the invention. As shown in FIG. 3, AFP scanner 56 includes receiver circuit 410 coupled to signal/command processor 400. Receiver circuit 410 includes RF 405 and IF 407 sections for intercepting and tuning a desired traffic or control frequency using known superheterodyne techniques. The IF section 407 of the receiver circuit 410 extracts the baseband signal and signal characteristics for the tuned channel carrier frequency to the analog-baseband converter circuit 404 of the signal/command processor 400. In this embodiment, baseband information extracted by the IF section 407 includes analog RSSI (signal strength) measurements and demodulated base FM signals, and in-phase (I) and quadrature (Q) signals used in decoding TDMA encoded digital data perceived on the tuned candidate voice or data frequency. The receiver 410 according to the present embodiment is discussed in more detail below with reference to FIG. 4.

Central processing unit CPU 402 of signal/command processor 400 is coupled to TCM communications interface 430 for receiving frequency monitoring requests and instructions issued by the AFP controller 50 (FIG. 2), as well as transmitting signal strength and/or signal quality measurement data for the requested frequencies to the AFP controller 50. Using appropriate request processing instructions 409 contained in memory 408, CPU 402 parses these frequency monitoring requests/instructions and will direct the receiver 410 to tune a given frequency of interest.

CPU 402 is also coupled to analog-baseband converter circuit 404. Analog-baseband converter circuit generally implements A/D and D/A conversions of signals received by the receiver 410, including associated filtering functions. To this end, in the present embodiment, the analog-baseband circuit 404 incorporates a wide-band data demodulator circuit (not shown) that decodes received bits for candidate voice and control channel frequencies into Manchester data streams, as is well-known in the art. In the digital mode, circuit 404 also performs π/4 Differential Quaternary Phase Shift keying (DQPSK) demodulation processing for the candidate channel frequency tuned by receiver 410.

Digital signal processor DSP 406 interfaces with analog-baseband converter 404 to measure RSSI values for all candidate frequencies, as well as measure perceived bit error rates "BERs" for candidate control frequencies using conventional processing techniques. Further, the DSP 406 preferably incorporates recognition functionality for classifying the frequency or channel as one of the following types encountered in a TDMA/AMPS dual-mode environment: analog voice channel, IS-54B Digital Traffic Channel, IS-136 Digital Traffic Channel or IS-136 Digital Control Channel. Once RSSI, frequency type and BER values are obtained, they are submitted to the CPU 402 for subsequent transmission to the AFP controller 50 via the TCM communications interface 430 or alternative via the RS-232 interface 420.

As discussed above, TCM communications interface 430 is used to receive and decode incoming TCM data specifying channel monitoring requests issued by the AFP controller 50 and relayed by PBX 54. Furthermore, interface 430 also is responsible for the response data issued by the CPU 402 into TCM format. Note, however, the teaching of the present invention is not limited to any particular data signaling format or type of support logic and driving circuitry as long as bi-directional data communications can be directly or indirectly achieved between the AFP scanner 56 and AFP controller 50.

FIG. 3 also shows an RS-232 interface 420 for accessing and controlling the operation of CPU 402 and the other components of the AFP scanner 56, as is known in the art.

Figure 4:
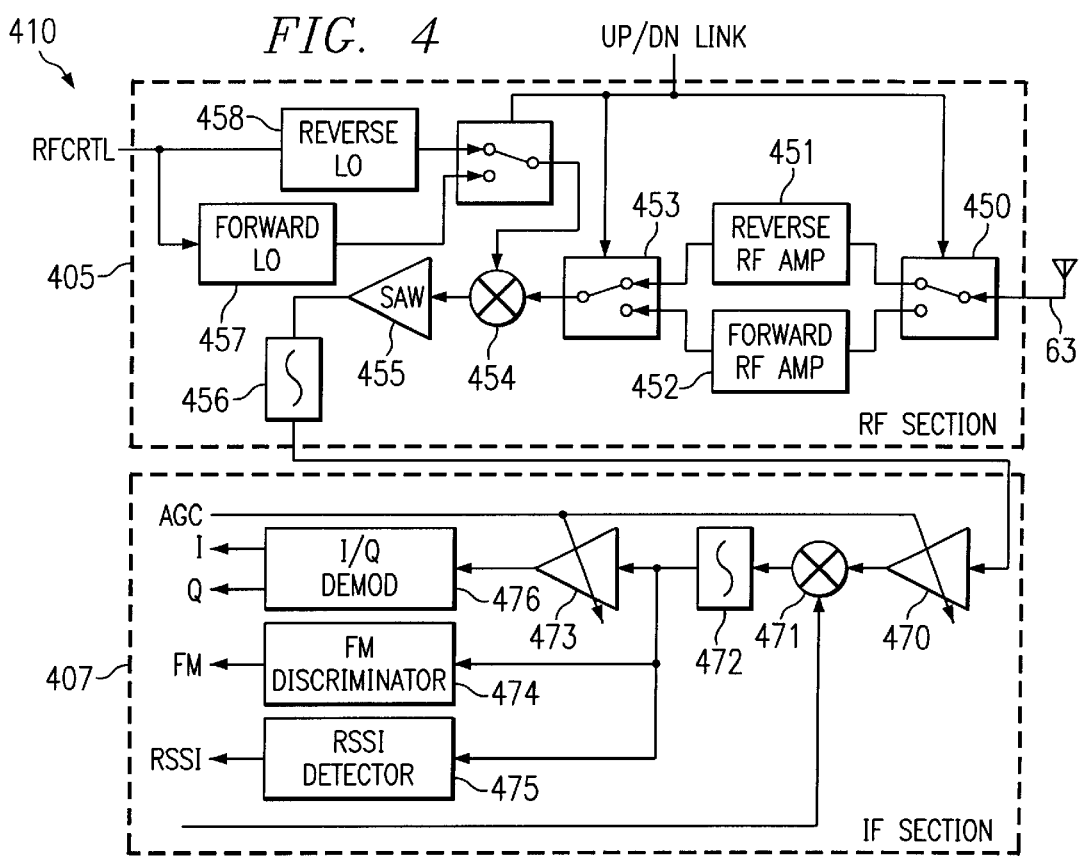
FIG. 4 is a detailed schematic diagram of the receiver front end of the automatic frequency planning scanner shown in FIG. 3.

FIG. 4 is a more detailed schematic diagram of the RF receiver 410 according to the first embodiment of the invention. As shown in FIG. 4, RF section 405 according to this embodiment incorporates a split front end path for acquiring and conditioning channel frequencies in both the forward and reverse sub-bands of the operational band. More specifically, dual pin diode switches 453 and 450 are used to switch in either the forward RF amplifier 452 or reverse RF amplifier 451 into series with RF antenna 63 for conditioning the incoming RF signal. The CPU 402 controls the operation of these switches 450, 453 through asserting a logic "0" or logic "1" on the UP/DN LINK input, as well as controlling which local oscillator (Reverse LO 458 or Forward LO 457) should be selected to control RF mixer 454. The selected one of the reverse and forward RF amplifiers 451, 452 passes its entire band of interest to the RF mixer 454.

In the configuration thus comprised, the RF section 405 of the present embodiment can intercept and tune a channel frequency candidate from either the forward (824–849 MHz) or reverse (869 to 894 MHz) sub-bands. In either case, the RF mixer converts the received signal to an appropriate IF carrier (e.g. 83.16 MHz), and is filtered through wideband IF filter 456 for subsequent conditioning by the IF section 407 of the receiver 410.

The IF section 407 of the present embodiment is a dual mode design incorporating automatic gain control ("AGC") well known in the cellular arts. Accordingly, detailed description thereof is omitted here. However, it should be realized that both analog mode FM and digital mode I,Q values are generated by the FM discriminator 474 and I/Q demodulator 476 units of the IF section 407, along with RSSI measurements for all channel candidates tuned by the RF section 405.

Although as shown in FIG. 4 the RF section 405 includes separate forward and reverse band amplifiers (451 and 452), it should be apparent to those ordinarily skilled in the art that any number of RF amplifiers may be utilized (one or more) as long as it or they are collectively capable of tuning to any traffic, control or management frequency within the operational band of interest.

FIGS. 11A and 11B represent elevation and top plan views, respectively, of the automatic frequency planning scanner of this embodiment. As shown therein, the AFP scanner 56 is enclosed in a modular housing 490. The housing can comprise any sturdy, impact resistant material such as plastic, or metal, as is well known in the art. The RF antenna 63 is affixed to the housing in a pivotal manner and is electrically coupled to RF receiver 410 through an orifice 493a in the housing 490. An orifice in the housing 490 (not shown in the figures) is used to provide access to the TCM communications I/F connector of interface 430.

FIG. 11A also shows a power and AFP scanner operational status indicator 493b in housing 490. Orifice 492 is used herein to access a recessed connector 492a designed to route power and TCM information to the internal components of the AFP scanner 56 through a power converter (not shown) and TCM communications I/F connector of interface 430 (FIG. 3). Orifice 491 is used to provide access to an RS-232 connector (not shown) and RS-232 interface 420.

The AFP controller 50 according to the first embodiment of the invention along with its interactions with the AFP scanner 56 of the same embodiment will now be described with reference to the block diagram of FIG. 5 and the flowcharts of FIGS. 6A–6C and 7A–7C.

At the outset, it should be noted here that components of the AFP controller 50 shown in FIG. 2 may be conveniently implemented using a general purpose digital computer programmed according to the teachings of the specification, as would be apparent to those ordinarily skilled in the computer arts.

Appropriate software coding can be readily prepared based on the teachings of the present disclosure, as will be apparent to those ordinarily skilled in the software arts.

Though not preferred, the AFP controller 50 can also be implemented by the preparation of application-specific integrated circuits or by interconnecting an appropriate network of conventional components, devices and circuits, as will be readily apparent to those skilled in the art.

Figure 5:
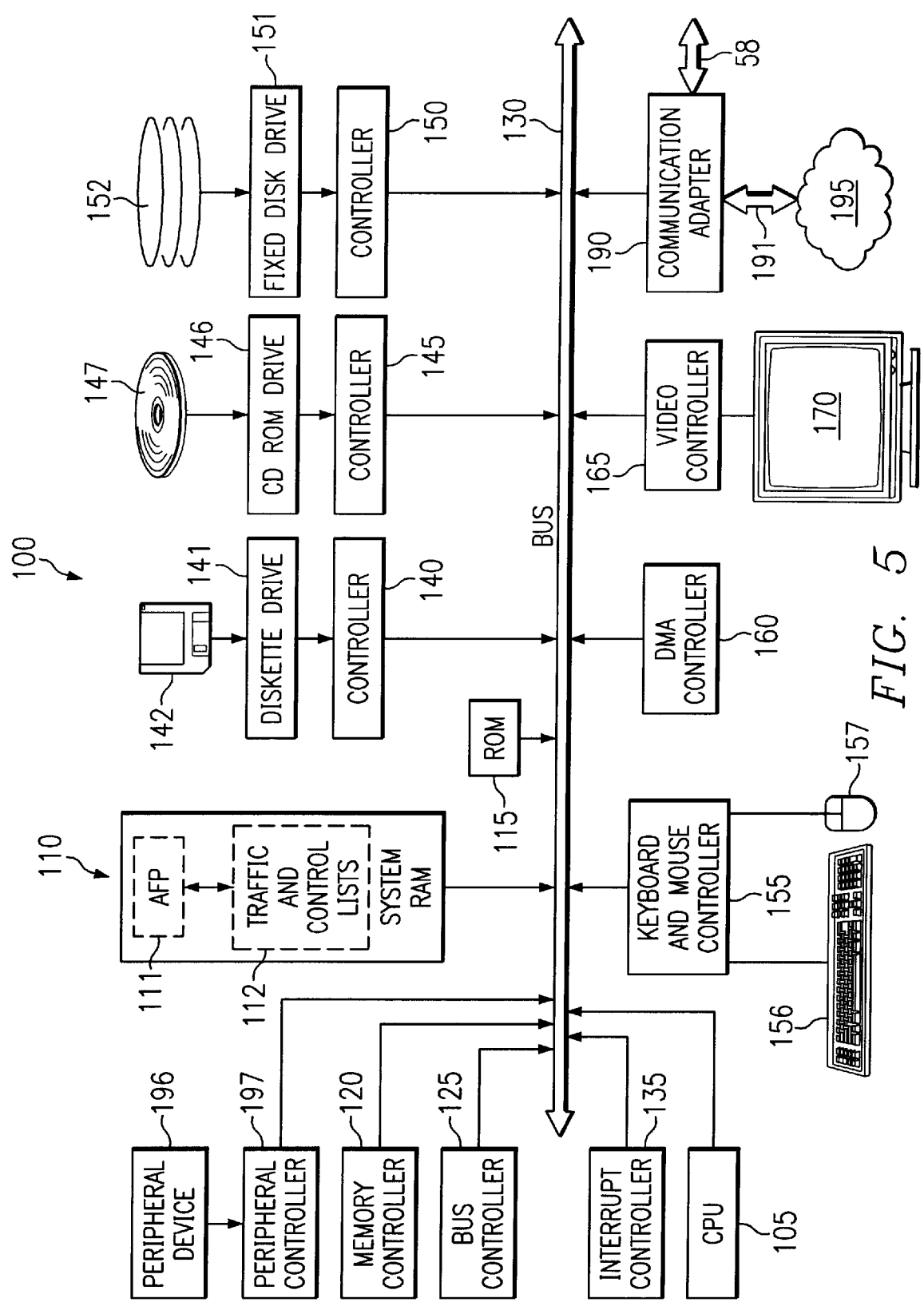
FIG. 5 is an overall configuration diagram of a general purpose computer system implementing the automatic frequency planning controller according to the embodiment shown in FIG. 2.

FIG. 5 illustrates the system architecture for a computer system 100 such as an IBM PC compatible computer with which the AFP controller 50 of the present embodiment can be implemented. The exemplary computer system of FIG. 5 is for descriptive purposes only. Though the description below may refer to terms commonly used in describing particular computer systems such as an IBM PC compatible computer, the descriptions and concepts equally apply to other systems, including systems that have architectures dissimilar to those shown in FIG. 5.

As shown in FIG. 5, the computer system 100 includes a central processing unit ("CPU") 105, which may include a conventional microprocessor, random access memory ("RAM") 110 for temporary storage of information, and read only memory (ROM) 115 for permanent storage of information. A memory controller 120 is provided for the controlling system RAM 110. A bus controller 125 is provided for controlling bus 130, and the interrupt controller 135 is used for receiving and processing various signal interrupts from these and other system components.

Mass or secondary storage may be locally provided by diskette 142, CD-ROM 147 or hard disk 152. Data and software may be exchanged with the computer system 100 via a mobile media such as diskette 142 and CD-ROM 147. Diskette 142 is insertable into diskette drive 141, which is in turn connected to bus 130 by controller 140. Similarly, CD-ROM 147 is insertable into CD-ROM drive 146 which is in turn connected to bus 130 by controller 145. Finally, hard disk 152 is part of a fixed disk drive 151, which is connected to bus 130 by controller 150.

User input to computer system 100 can be provided by a number of devices. For example, keyboard 156 and mouse 157 are connected to bus 130 by keyboard and mouse controller 155. An optional peripheral device 196 can be connected to bus 130 by peripheral controller 197, which may include an RS-232 serial controller or parallel port controller. It will be obvious to those ordinarily skilled in the art that input devices such as a pen and a tablet and a microphone for voice input may be connected to the computer system 100 as well. DMA controller 160 is provided for performing direct memory access to system RAM 110. A visual display is generated by video controller 165, which controls video display 170.

Referring still to FIG. 5, computer 1.00 also includes a communications adapter 190 which allows it to be interconnected to high speed communications link 58 (FIG. 2) to enable high speed communications with PBX 54, a local (LAN) or wide area network (WAN) (not shown), and/or the Internet, schematically illustrated by link 191 and network 195.

Computer system 100 is generally controlled and coordinated by operating system software such as the Windows operating system available from Microsoft Corporation of Redmond, Wash. Operating system software controls routine allocation of system resources and performs such tasks as process scheduling, memory management and networking, and I/O services.

In each of the preferred embodiments of the present invention, the below described initial scan and ongoing frequency monitoring techniques and processes handled by the AFP controller 50 take the form of interdependent routines executing a general purpose processing system such as computer 100 described hereinabove. These routines permit computer 100 to serve as the AFP controller 50 shown in FIG. 2, and carry out the initial traffic and control frequency sweeps as well as ongoing monitoring of backup control and voice channel frequency candidates for reservation and use by the microsystem 26 when computer 100 reads and executes the corresponding programming instructions from a computer readable storage medium.

Preferably the storage medium is system RAM 110 as shown in FIG. 5 with AFP routines, indicated therein by the dashed line box 111, in conjunction with backup, residual, active-assigned, and neighbor lists 112 also stored in system RAM 110. It should be realized, however, that the storage medium containing these routines may input any type of disk medium including floppy disk 142, an optical disk such as CD-ROM 147 or Magneto Optical variations thereof, hard drive 152 or disk arrays, located within or external to computer system 100 or residing at a remote location accessible via a local area wide area network or the network 195. Alternatively, this storage medium can include ROM 115, non-volatile memory or any other type of media suitable for storing computer readable instructions, as well as any routine combinations thereof as is understood by those ordinarily skilled in the art.

In terms of controller functionality, upon microsystem 26 activation, the AFP controller 50 first attempts to set up an initial list of active-assigned, backup and residual traffic channels, as well as at least one control channel microsystem 26 could use without interfering with the overlying macrosystem. The initial scan and channel acquisition procedures implemented by AFP controller 50 of the present embodiment are detailed below with reference to FIGS. 6A–6C.

Figure 6A:
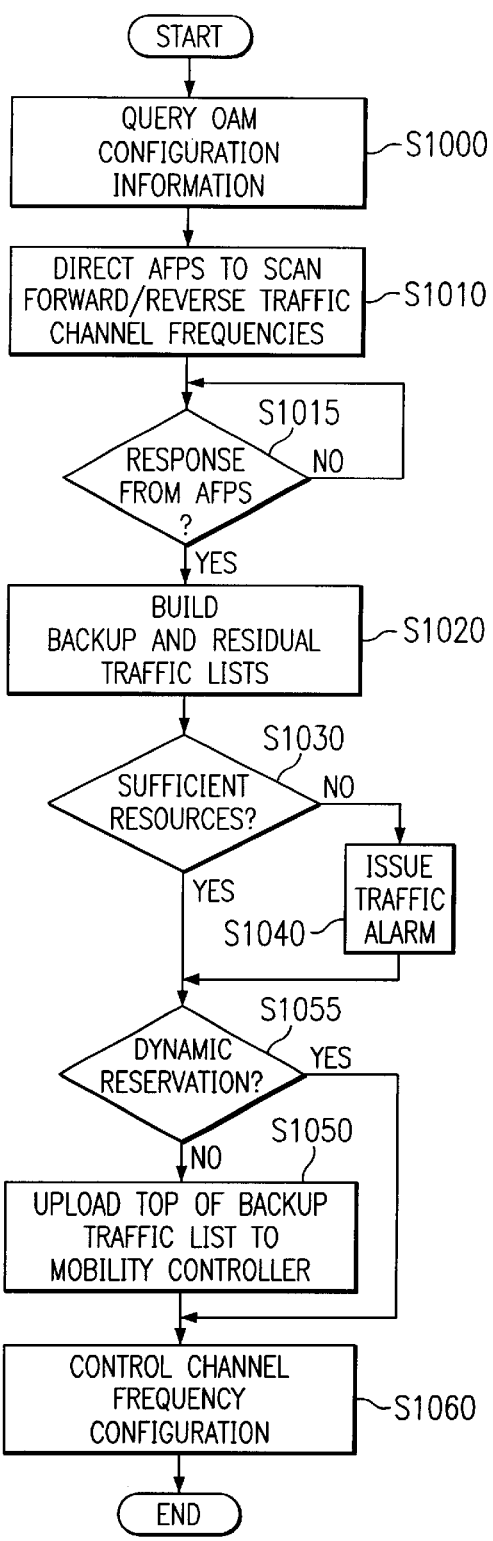
FIGS. 6A–6C are flow charts illustrating initial frequency planning operations carried out by the AFP controller shown in FIG. 5.

Turning first to FIG. 6A, initial scan and channel selection processing begins at step S1000, in which Operation, Administration, Maintenance (OAM) configuration information is queried from a data base, user input or similar process known in the art. In this embodiment, OAM configuration information includes, e.g. predefined traffic and/or control channel frequency seeding, channel frequency spacing or separation, all of which help to define the type of macrosystem the microsystem 26 is intended to cooperate with. In addition, OAM configuration information may include the maximum size of the backup list that the AFP controller should monitor, or the RSSI/BER threshold values above which the traffic or control candidate may be disqualified to prevent co-channel interference with the macrosystem. Moreover, OAM configuration information will preferably include programmable statistical analysis interval and depth information to customize a long term historical performance data base for the backup and residual list of channel frequencies to be referenced when a member of the active-assigned list has been disqualified such as due to interference or re-seeding. In this embodiment, configuration information as to whether PSP-POF compatible mobiles, as is well known in the art, will be queried as well. This information will be used to determine how the microsystem neighbor list will be maintained as will be discussed in greater detail herein below.

In this embodiment, configuration information as to whether dynamic reservation or allocation of traffic channels to the mobility controller 51 by the AFP controller 50 on an as-needed basis will be queried as well. This information is used to determine if, at initial traffic channel scan and acquisition, whether the AFP controller will upload a set of favored traffic channels or will it wait until the mobility controller actually requests that a traffic channel be assigned for base-mobile communications.

Of course, the above-described configuration information may alternatively be derived from default values contained in the system RAM 110 (FIG. 5), system ROM 115 or storage medium accessible to computer 100.

Once OAM configuration information has been queried and evaluated, control passes to step S1010, in which the AFP controller initiates a request to the AFP scanner to scan all the forward and reverse traffic channel frequencies within the macrocellular system operational band to obtain traffic channel candidates for the microsystem 26. In this embodiment, the AFP controller will utilize resources of communication adapter 190 of computer system 100 to build the appropriate request and deliver it to AFP scanner 56 via PBX 54 using PBX call procedures, TCM signaling and data transmission techniques, as is known in the art.

Thereafter, control passes to step S1015, in which the AFP controller awaits channel identification measurement data obtained by AFP scanner 56 after sweeping the forward and reverse traffic bands. Thereafter, control passes to step S1020 for further processing described below. It should be realized at this point that although not shown in FIG. 6A, the AFP controller can include processing for re-broadcasting the initial traffic channel request to the AFP scanner if it is busy or unavailable.

At step S1020, the AFP controller builds the backup and residual traffic list based on information returned by the AFP scanner for each forward and reverse traffic channel frequency in the desired operational band. In this embodiment, the OAM configuration information relating to the size of the backup list and RSSI thresholds is used to develop an ascending data base of forward and reverse traffic channel frequencies sorted by perceived RSSI levels.

As used herein, the terms "backup list" and "residual list" are directed to classifications the AFP controller uses to assist in selecting those traffic or voice frequencies in the desired operational band that can be safely reused by the microsystem 26. RSSI measurements perceived by the AFP scanner are used in this embodiment to segregate the available frequencies between the backup and residual lists. Here, the backup list includes all traffic frequencies where their perceived RSSI values preferably do not exceed background noise measurements and are deemed safe for use. Though not preferred, backup list may also include traffic frequencies in which perceived RSSI values may have once exceeded background noise levels, potentially indicating some degree of use by the overlying macrosystem or competing microsystem(s) (i.e. microsystems that utilize the same operational band as microsystem 26.) and so are not as favored for microsystem reuse. These frequencies will necessarily be ranked lower in the backup list, but may yet be allocated for use within the microsystem should capacity demands of the mobility controller 51 require their use.

The backup list may also include former members of the favored or residual lists whose demotion or promotion respectively was fostered through historical analysis detailed hereinbelow. It should be noted here that the backup list will be sorted in ascending order based on RSSI measurements taken by the AFP scanner 56 and delivered in step S1015.

As the name implies, the residual list contains those frequencies in the operational band that are likely being reused by the overlying macrosystem or competing microsystems based on current perceived RSSI measurements or historical data collected by the AFP controller 50. In this embodiment, these frequencies will not be assigned for use within the microsystem 26.

In addition, the AFP controller will maintain an active-assigned list of traffic channels which have actually been uploaded to the mobility controller 51 for use in the microsystem 26. If a dynamic reservation is chosen, from querying configuration information, the mobility controller 51 will request and the AFP controller 50 will upload an available traffic channel (frequency pair) from the top of the sorted backup list. Thereafter, the AFP controller 50 will transfer the uploaded traffic channel from the backup list to the active assigned list.

If, however, dynamic reservation is not indicated from the configuration information query, the active-assigned list will contain a set of traffic channels originating from the top of the backup list called during the initial scan procedure. Turning back to FIG. 6A, once the backup and residual traffic lists have been compiled, control passes to step S1030 in which a determination is made whether there are sufficient traffic resources in the backup list to warrant frequency planning. If not, control passes to step S1040 in which a traffic channel alarm is issued to the microsystem 26 and/or system configuration operator and the AFP controller 50 will continue to attempt to automatically define backup and residual traffic channel frequencies with what available frequency resources it has identified in step S1020.

If, however, a determination is made in step S1030 that sufficient traffic channel frequency candidates exist to build complete favored and backup traffic lists, control instead passes to step S1055 in which a determination is made whether dynamic reservation of traffic channels has been indicated in the configuration information queries detailed hereinabove. If the mobility controller has not utilized dynamic reservation, control passes to step S1050 in which the top of the backup traffic list is uploaded from the AFP controller 50 to the mobility controller 51. The depth of this upload is determined by the configuration information previously queried, and/or default values as known in the art. If however, in step S1055, the determination is made that dynamic reservation is to be utilized for the mobility controller 51, control passes to step S1060 directly. Once the active-assigned traffic channel frequencies have been uploaded, the AFP controller 50 configures control channels for the microsystem 26.

Details of the control channel configuration process according to the present embodiment will be discussed here below with reference to FIGS. 6B and 6C. As shown in FIG. 6A, once control channel configuration has been complete, initial traffic and control channel allocation processing according to the present embodiment is deemed complete.

Figure 6B:
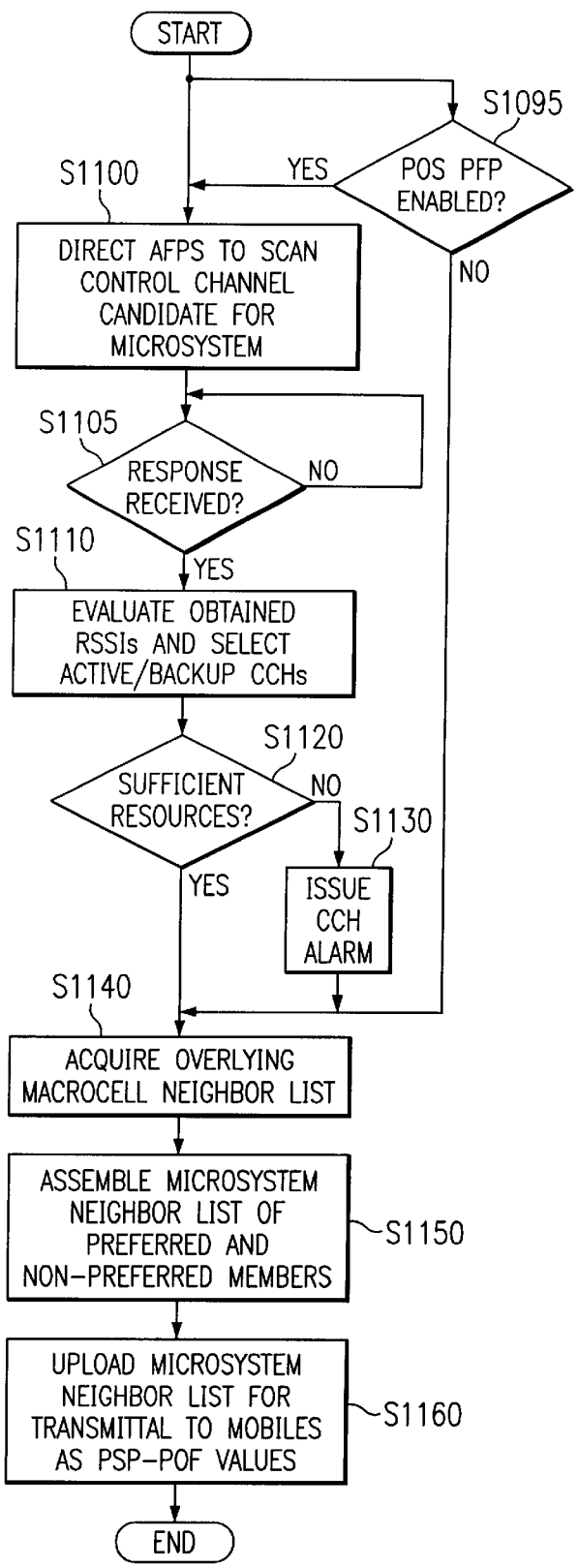

Turning now to FIG. 6B, FIG. 6B illustrates control channel frequency configuration processing by the AFP controller 50. Such processing begins at step S1095, in which PSP-POF compatibility is checked. Here, if the PSP-POF compatibility is determined to be active (i.e. the PSP-POF compatibility Boolean is set) this means that registered mobiles operating within the microsystem use PSP-POF scanning procedures for identifying control channels within the operations band of interest, as is known in the art In this embodiment, if PSP-POF is enabled, it should be realized that the microsystem can acquire any unused frequency pair in the operational band of interest for the active or any one of the backup control channels within the microsystem neighbor list since the PSP-POF compatible mobiles can scan the entire operation band when seeking control channel for systems they attempt to register with. However, if the PSP-POF compatibility Boolean is not set, it is assumed that the mobiles can only tune to predetermined control channels selected by the macrosystem planner and recorded in the neighbor lists of the macrosystem.

Thus, if flexibility is desired in the selection of the microsystem control channels, the PSP-POF compatibility Boolean should be set. Accordingly, the AFP controller-AFP scanner tandem can: 1) scavenge the entire operational band to find suitable control channel candidates; or 2) select the control channel from one or more sub-bands of the operational band or discrete frequencies specified in the above-mentioned configuration information. However, if legacy mobiles incompatible with PSP-POF scanning requirements are to be supported by the microsystem 26, the PSP-POF Boolean should be cleared.

Still referring to FIG. 6B, if the PSP-POF Boolean is determined in step S1095 to be set, control passes to step S1100 wherein the AFP controller 50 directs the APF scanner 56 to scan for microsystem control channel candidates within the parameters set within the aforementioned configuration information (e.g. the entire operational band or a subrange or range thereof, as well as a list of preselected frequencies).

Thereafter, control passes to step S1105 in which the AFP controller waits until it receives channel frequency candidate information from the AFP scanner. Control thereafter passes to step S1110. At step S1110, the AFP controller evaluates RSSI values returned by the AFP scanner for each control channel frequency candidate and selects a set of active and backup control channel frequencies for the microsystem from a set of those frequency candidates whose RSSI values do not exceed a predetermined threshold. Thereafter control passes to step 1120 as shown in FIG. 6B.

In step S1120, the AFP controller makes a determination whether there are sufficient clean control channel frequency candidates for use by the microsystem without interfering with overlying macrosystem operations. If so, control passes to step S1140. However, if there are not enough control channel resources available, control instead passes to step S1130 in which control channel alarm is issued to the microsystem 26 by the AFP controller 50. Nevertheless, control thereafter passes to step S1140 in this embodiment so that available resources can be utilized to the extent possible.

If, however, in step S1095 it is determined that the PSP-POF compatibility Boolean is clear and described above, control instead bypasses steps S1100–S1130 and passes directly to step S1140.

At step S1140, the AFP controller will direct the AFP to acquire the overlying macrocell neighbor list for use in assembling the microsystem neighbor list. A more detailed illustration of this process step is detailed in FIG. 6C.

Figure 6C:
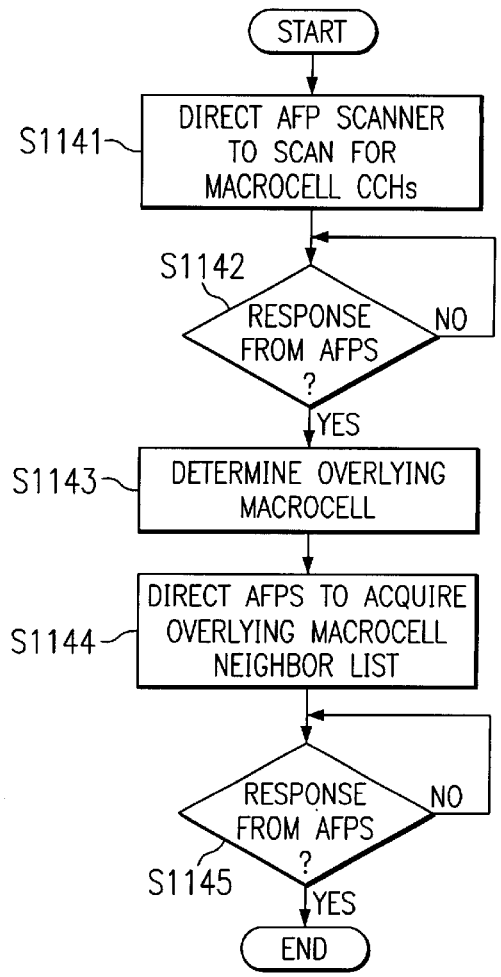

Turning briefly to FIG. 6C, control passes from step S1140 (FIG. 6B) to begin at step S1141 in which the AFP controller 50 directs the AFP scanner 56 to scan the operational band of the microsystem for the macrocell control channels within range of the AFP scanner. Once such control channels have been identified by the AFP scanner and an appropriate response is received by the AFP controller 50 (step S1142), control passes to step S1143 in which the AFP controller, using RSSI measurements in this embodiment, determines the control channel or channels for the overlying macrocell which the microsystem 26 is operating within. Thereafter, in step S1144, the AFP controller 50 directs the AFP scanner to acquire the neighbor list broadcast over the overlying macrocell control channel(s) identified in step S1143. Once the overlying macrocell neighbor list has been acquired by the AFP scanner 56 and uploaded to the AFP controller 50 (step S1145), processing returns to step S1140 (FIG. 6B) and control passes to step S1150.

Turning back to FIG. 6B, at step 1150, the AFP controller 50 assembles a neighbor list of preferred and non-preferred members with the preferred members constituting the active and backup control channels specified for the microsystem 26 and the non preferred members include the control channels of the overlying macrosystem as well as those in use by competing Microsystems.

In this embodiment, the active and backup control channels allocated to the microsystem as determined in steps S1110–S1130 constitute the preferred members of the microsystem neighbor list if PSP-POF compatibility is to be maintained. However, if PSP-POF compatibility is not to be maintained, the preferred members of the microsystem neighbor list will comprise the private operating frequency or frequencies identified within the overlying macrocell neighbor list obtained in step S1140.

Regardless whether PSP-POF compatibility is indicated in this embodiment, the non-preferred members of the microsystem neighbor list will match the PSP channels identified in the overlying macrosystem's neighbor list. Alternatively, though not shown in FIG. 6B, to apprise registered mobiles operating within microsystem 26 of competing microsystem control channels, the AFP controller may direct the AFP scanner to scan the entire operation band of interest (except for the previously identified macrocell control channels) to seek out such microsystems and include them as non-preferred neighbors within the microsystems 26 neighbor list based again on their perceived RSSI values.

An example of a microsystem neighbor list according to the present embodiment is shown in FIG. 8A. Here, the AFP controller has identified control channels 1015 and 900 as emanating from the overlying macrosystem based on overlying macrocell neighbor list data acquired in step S1140 of FIG. 6B (through execution of substeps S1141–S1145 shown in FIG. 6C). In addition, four clean channels have been identified as microsystem control channel candidates (channels A, B, C and D in the figure). The AFP controller selects the relatively cleanest one of these channels as the active control channel for the microsystem (here channel A) and labels the remaining channels (B, C, D) as potential backup channels should the active channel fail.

FIG. 8B shows corresponding PSP-POF information broadcast to the registered mobiles 22b operating within the geographical service area 28. It should be noted here that the PSP values are retained from the macrosystem neighbor list in order to preserve the registered mobiles 22b capability to switch to the overlying macrosystem.

Turning back to FIG. 6B, once the microsystem neighbor list has been assembled, control passes to step S1160. At step S1160, the AFP controller 50 broadcasts to the mobility controller 51 the assembled neighbor list for transmittal to the registered mobiles 22b as PSP-POF values. Thereafter initial control channel configuration according to the present embodiment terminates. Ongoing monitoring, scanning, and maintenance of the active-assigned, backup and residual traffic frequency and neighbor lists by the AFP controller 50 according to this embodiment will now be described with reference to FIGS. 7A–7C.

Figure 7C:
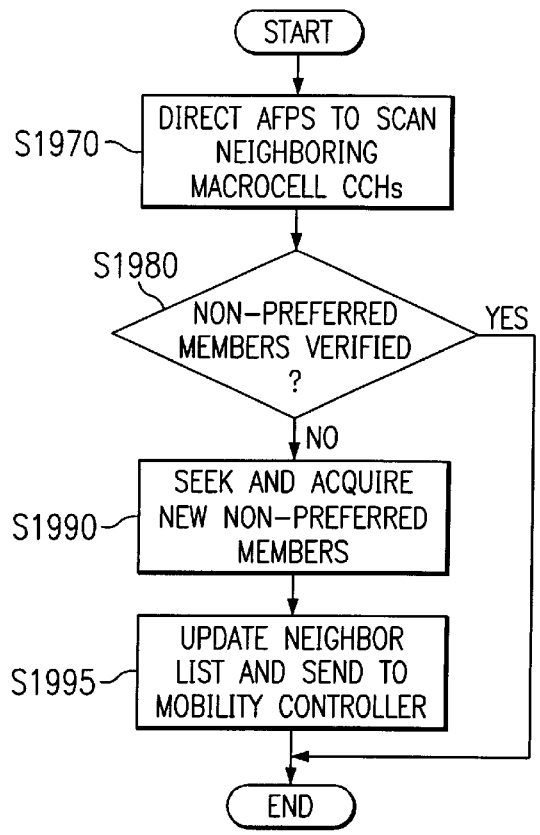
Figure 7A:
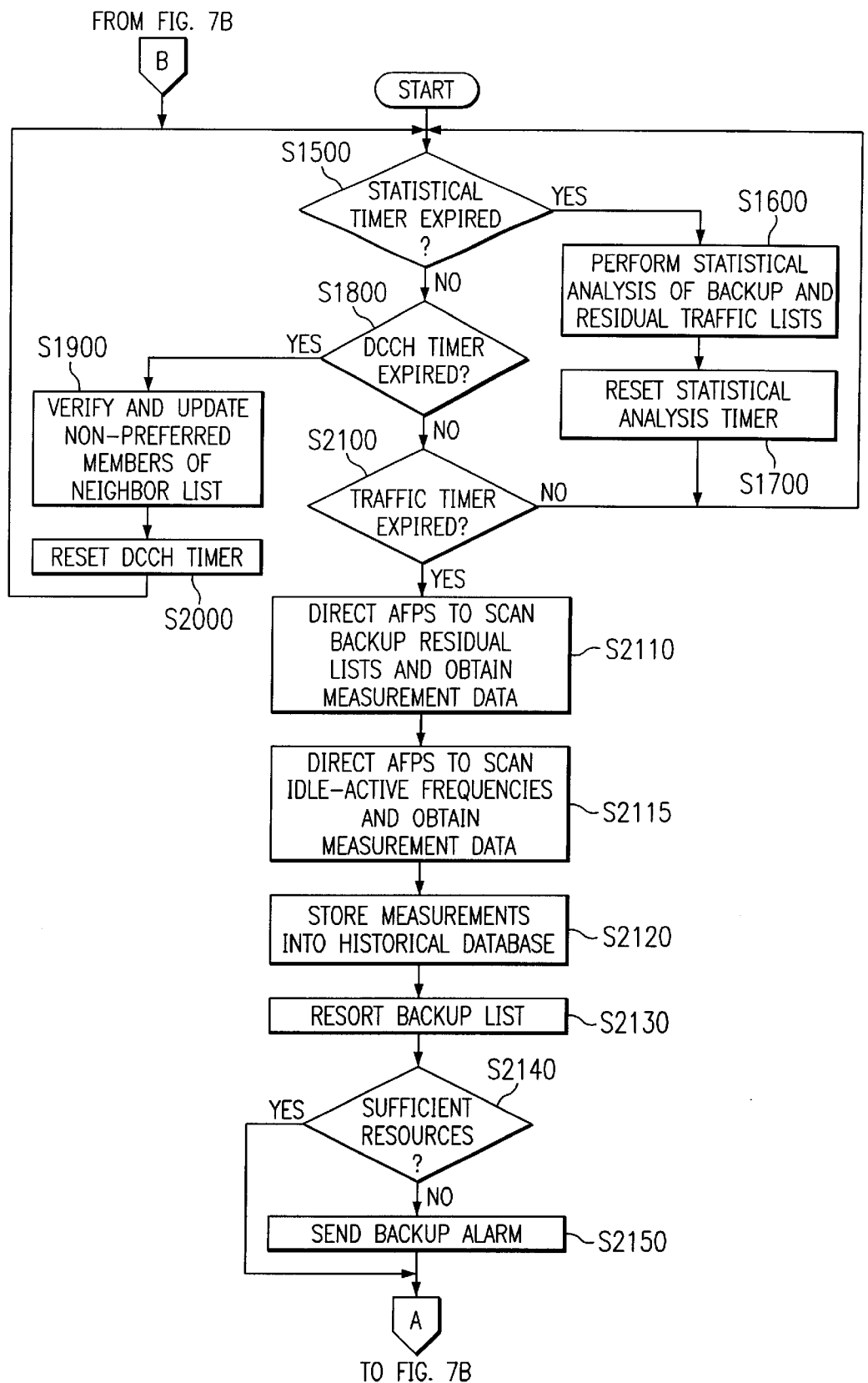

Turning first to FIG. 7A, this figure depicts a flow chart including the general monitoring procedure implemented by the AFP controller 50 after completion of the initial scan procedures detailed above with reference to FIGS. 6A–6C. Preferably, the general monitoring procedure shown in FIG. 7A will be invoked until an asynchronous termination event occurs, such as a power fault or shut-down of the AFP controller 50.

With reference to FIG. 7A, general monitoring by the AFP controller 50 according to the first embodiment begins at step S1500. At step S1500, a determination is made whether a statistical analysis watchdog timer has expired. This statistical analysis timer is used to signal the AFP controller 50 at regular intervals when statistical analysis and updates of backup/residual traffic lists needs to be performed in order to keep these lists valid and reduce the likelihood of the microsystem 26 interfering with the overlying macrosystem. The duration of this timer is preferably programmable, and default or user-defined duration values therefor can be specified in the OAM configuration data discussed hereinabove.

If, in step S1500, a determination is made that the statistical analysis timer has expired, control passes to step S1600. At step S1600, statistical analysis using a historical measurement database is used to update the backup and residual traffic lists. Such statistical analysis techniques are described in U.S. patent application Ser. No. 08/409,802, filed Mar. 24, 1995 and commonly assigned with present application to Northern Telecom Limited of Montreal, Canada, which is incorporated herein fully by reference. In sum, 95% normalized historical analysis of the historical measurement database is used to resort or re-rank the member frequencies of the backup and residual list. Once resorted, the AFP controller promotes consistently improved members of the residual list to the backup list for potential use in the microsystem.

Once analysis, backup and residual list reordering and conditional promotion completes, control passes to step S1700. In step S1700, the statistical analysis timer is reset and control loops back to step S1500, where the status of this timer is again polled.

If, however, in step S1500, a determination is made that the statistical analysis timer has not expired, control instead falls through to step S1800. At step S1800, a determination is made whether the non-preferred neighbor list ("DCCH") watchdog timer has expired. This timer is used to signal the AFP controller when to monitor control channel frequencies allocated to non-preferred members of the microsystem neighbor list in order to prevent stale neighbor list data from being maintained in mobiles 22b registered on the microsystem 26 or within the mobility controller 51 of the microsystem 26. Like the statistical analysis timer, its duration too is preferably programmable and can be specified through user input, OAM configuration information, or through a predefined default interval.

If, in step S1800, the AFP controller 50 determines that the neighbor list/DCCH timer has expired, control passes to step S1900 in which the neighbor list is verified and potentially updated. A more detailed discussion of step S1900 procedures may be found hereinbelow with reference to FIG. 7C. Thereafter, in step S2000, the neighbor list timer is reset and control loops back to step S1500 to resume statistical analysis timer polling discussed above.

If, however, in step S1800, a determination is made that the neighbor list/DCCH timer has not expired, control instead passes to step S2100. At step S2100, the status of yet another programmable watchdog timer (i.e. the traffic timer) is interrogated to see if it has expired. This timer is used to periodically signal the AFP controller 50 to acquire measurement data from the AFP scanner 56 for members of the backup and residual traffic lists as well as verify the active-assigned frequencies not currently in use and the active control channel being used by the microsystem 26. Like the neighbor list and statistical analysis timers, the traffic timer is user definable and programmable.

At this point, it should be noted that while the statistical analysis, traffic and neighbor list timers are programmable in this embodiment, the duration of the traffic timer should be the shortest of the three, since the microsystem 26 is more likely to encounter traffic frequency reallocation in the overlying macrosystem than control channel or neighbor list variation. Likewise, the duration of the statistical analysis timer will ordinarily be the longest, and in fact, should be on the order of a day or longer (depending on the depth of the historical database) in order to perform analysis on a large set of frequency measurement samples collected over a relatively long term.

Turning back to FIG. 7A, if, in step S2100, the AFP controller determines that the traffic timer has not yet expired since its last reset, control loops back to step S1500 in order to poll the status of the statistical analysis timer. However, if in step S2100 it is determined that the traffic timer has expired (indicating that the AFP controller should begin requesting and collecting measurement data for members of the backup and at least a portion of the residual list via the AFP scanner 56), control instead passes to step S2110.

In step S2110, the AFP controller 50 directs the AFP scanner to scan all frequencies in the operational band of the overlying macrosystem currently grouped into the backup list, along with at least a subset of those operational band frequencies contained in the residual list. The AFP scanner 56 will then perform frequency scanning operations on the frequencies set forth in the request, and will transmit measurement data (i.e. RSSI values) for them in request order back to the AFP controller 50. Control thereafter passes to step S2115 in which the AFP controller directs the AFP scanner to scan idle channels in the active-assigned list and obtain RSSI measurement data therefor.

Control thereafter passes to step S2120, in which the AFP controller stores the measurements obtained in step S2110 in a historical database preferably located in RAM 110 (FIG. 5). This historical database preferably contains for each channel frequency contained in the backup and residual traffic lists, samples of perceived RSSI values measured by the AFP scanner 56 taken over regular intervals in the course of a day, week or month, depending on the capacity of the table and the duration of the interval. It should be realized here that this interval is approximately the same as the duration of the traffic timer, and the capacity or depth of the database is related to the duration of the statistical analysis timer. This data is later used to analyze usage of the channel frequency by the overlying macrosystem and competing microsystems, and can be used to sort and reorder membership in the backup and residual lists. Control thereafter passes to step S2130.

At step S2130, the backup list is resorted by the AFP controller. In this embodiment, the backup list is sorted on the basis of RSSI measurement data obtained in step S2110. This allows the AFP controller 50 to quickly distribute a suitable backup frequency to the mobility controller 51 for use in wireless communications within the microsystem 26 should additional capacity be desired. Likewise, the AFP controller will be able to quickly identify backup list members which should be demoted to the residual list since their perceived RSSI levels exceed a predetermined tolerance threshold (signaling their probable use by mobiles 22a, 22b, fixed-end transceivers 18 of the overlying macrosystem, a competing microsystem, or even another type of RF emitting system).

Control thereafter passes to step S2140, in which a determination is made whether there are a sufficient number of members in the backup list based on OAM configuration data, selected RSSI thresholds, and measurement data acquired in step S2110. If insufficient resources exist, an alarm is issued in step S2150 and control passes to step S2160 wherein the AFP controller verifies the active control channel in use within the microcell 60 of the microsystem 26. Otherwise, control directly passes through to step S2160.

In step S2152, a determination is made whether any of the idle active channels scanned in step S2115 exceed the predetermined RSSI tolerances threshold discussed above. If any do, control passes to step S2154 and the compromised idle channels are removed from the active-assigned list and placed on the residual list. Then, in step S2156, the AFP controller notifies the mobility controller 51 of the removal of the compromised channels and offers the mobility controller replacement channels called from the top of the resorted backup list compiled at step S2130. Thereafter, control passes to step S2160.

If, however, in step S2152, a determination is made that none of the active-idle channels have been compromised, control instead passes to step S2160.

In step S2160, the AFP controller 50 seeks to verify the active microcell control channel preferably by directing the AFP scanner 56 to measure the active control channel. In turn, the AFP scanner 56 tunes to this control channel frequency pair, and attempts to measure perceived bit error rates (BERs) therefor. Thereafter, the AFP scanner responds with perceived BERs for the active control channel. Control within the AFP controller 50 thereafter passes to step S2170.

In step S2170, a determination is made whether the perceived bit error rates sent by the AFP scanner 56 for the active microcell control channel exceed a predefined threshold (which may be, for example, specified as part of the OAM configuration information or, in the absence thereof, a default threshold value). If the forward and reverse frequencies constituting the active microcell control channel have perceived BERs within the predefined threshold or tolerances, control passes to step S2180, in which the traffic timer is reset and processing loops back to step S1500.

However, if it determined in step S2170 that either the forward or reverse frequencies of the active microsystem control channel exhibit BERs exceeding the threshold, control instead passes to step S2190.

At step S2190, one of the backup control channels listed as a preferred member of the microsystem's neighbor list is selected by the AFP controller as the new active control channel for the microsystem. Control next passes to step S2195 to determine if PSP-POF compatibility is activated to discern how a new backup channel for the microsystem may be acquired. If PSP-POF compatibility is activated, the AFP controller of this embodiment will attempt to scavenge a new backup channel from the operational band of the microsystem. A subrange within that band, or a list of predetermined frequencies is obtained from the OAM configuration information detailed hereinabove.

Accordingly, control will pass to step S1910 (FIG. 7B) in order to verify the preferred members of the backup list as well as acquire a new backup control channel for the microsystem. If, however, PSP-POF compatibility is determined to be not activated at step S2195, control instead passes to step S2210. Here, since the mobiles will not be able to recognize any new preferred members of the microsystem backup list, the neighbor list is simply modified to show reassignment of one of the backup channels as the new active channel for the microsystem. Control thereafter passes to step S2180, in which the traffic timer resets, and control returns to the beginning of the loop at step S1500.

Turning now to FIG. 7B, FIG. 7B illustrates the procedures taken by the AFP controller-AFP scanner tandem of the current embodiment to verify the backup control channels of the microsystem neighbor list as well as acquire new backup channels should a deficit be created due to active channel reassignment (steps S2152–S2156 in FIG. 7A) or excessive RSSI identified on the backup channels. As shown in FIG. 7B, control begins at step S1910 where the AFP controller directs the AFP scanner 56 to scan all backup control channels contained in the neighbor list (channels B,C and D as presented in the sample neighbor list of FIG. 8A). More specifically, the AFP scanner 56 will tune to the backup microsystem control channels contained in the neighbor list and will measure RSSI values for the forward and reverse frequencies of each. Then, the AFP scanner will transmit the perceived RSSI values in request order for each of the backup control channels. Thereafter, control within the AFP controller proceeds to step S1930.

At step S1930, the AFP controller directs the AFP scanner to seek out and acquire at least one additional backup control channel to replace the backup channel promoted to active status as detailed above with reference to step S2190 of FIG. 7A. Moreover, if any of the perceived RSSI values are returned by the AFP scanner in response to the AFP controller request as detailed in step S1910, the AFP controller will direct the AFP scanner to find replacements for the so-compromised backup control channels as well. Control thereafter passes to step S1940, in which a determination is made whether sufficient microsystem backup channels now exist according to desired operational dictates, and if not, control passes to step S1950 to issue a CCH alarm. Of course, as before, the AFP controller will continue operation based on the resources at its disposal and return to step S2210 (FIG. 7A) to continue processing the modified microsystem neighbor list. If, however, if sufficient backup control channel resources exist, control returns to step S2210 as well.

To illustrate backup control placement in more detail, again consider the neighbor list example described above with reference to FIGS. 8A and 8B. As shown in FIG. 8A, assume that the active control channel for the microsystem 26 is "A". Further, assume that, in response to an active control channel verification request made by the AFP controller 50 (step S2160, FIG. 7A), the AFP scanner 56 returns measured BER values which exceeds a predefined threshold, indicating a likelihood of use by or interference with the overlying macrosystem, a competing microsystem, or another RF emitting device. According to FIG. 7A, the AFP controller 50 would designate channel "B" as the active control channel for the microsystem 26 (S2190), and would request the AFP scanner 56 to verify the existing backup microsystem control channels (S1910, FIG. 7B) and seek out another clean control channel for use as a backup control channel by the microsystem (S1930, FIG. 7B). These modifications to the neighbor list example of FIG. 8A are shown in FIGS. 9 and 1 OA. Note, that as shown in FIG. 10A, channel "E" is discovered to be a suitable replacement candidate to fill the empty backup control channel slot.

Referring back to FIG. 7A, at step S2210, the microsystem neighbor list is updated in accordance with processing identified above and is sent to the mobility controller 51 for broadcast to the registered mobiles operating on microsystem 26 as PSP-POF values (e.g. See FIG. 10B corresponding to the updated microsystem neighbor list of FIG. 10A). It should be noted here that if PSP-POF compatibility is not to be maintained as determined in step S2195, the stricken active control channel ("A" in FIG. 9) will not be replaced.

Thereafter, control passes to step S2180, in which the traffic timer is reset and processing loops back to step S1500.

FIG. 7C illustrates non-preferred member verification and update processing of step S1900 shown in FIG. 7A in more detail according to the present embodiment. Control begins at step S1970, the AFP controller 50 directs the AFP scanner 56 to scan for all non-preferred members in the microsystem neighbor list. As discussed hereinabove, according to this embodiment, the non-preferred members of the neighbor list comprise the control channels utilized by the overlying macrosystem in macrocells 12 and 12a, as shown in FIG. 1 as well as control channels in use by a competing microsystem (if any) operating within the same operational band as the overlying macrosystem.

The AFP scanner measures RSSI values of the frequencies associated with each non-preferred member of the neighbor list and reports these RSSI values back to the AFP controller 50. Thereafter, in step S1980, the AFP controller 50 determines whether the non-preferred members are still active (i.e. perceived RSSI levels beyond a predefined threshold will indicate that the channel is in use by the overlying macrosystem and any competing microsystems). If in step S1980 a determination is made that one or more of the non-preferred members is no longer in use, control passes to step S1990 in which the AFP controller directs the AFP scanner to scan all control channels designated in the operational band of the overlying macrosystem and report RSSI values for each. Once the AFP scanner completes the control channel scanning request, the AFP controller will determine non-preferred members based on RSSI values. Thereafter, at step S1995, the AFP controller will update the neighbor list to reflect revised non-preferred neighbor membership and then send this updated neighbor list to the mobility controller 51 for broadcasting the corresponding PSP-POF tables to the registered mobiles 22b. Thereafter, non-preferred neighbor list verification and modification processing by AFP controller 50 terminates.

If, however, in step S1980 it is determined that all non-preferred members are accounted for, non-preferred neighbor list verification and modification processing by AFP controller 50 terminates.

The above-described embodiments are directed to a single cell microsystem employing a single AFP scanner. However, it should be realized that the teachings of the present invention are not so limited and can conveniently address multiple AFP scanner deployment, which may be required to accurately assess frequency use within a large, complex, or cluttered microsystem. In such cases, multiple AFP scanners would be remotely positioned in the microsystem and each could communicate with the AFP controller preferably via its own bi-directional communications link, switched or unswitched depending on microsystem fixed end resources. In this alternative embodiment, the AFP controller would take the worst case RSSI or BER measurements for a given frequency as reported by each of the deployed AFP scanners in order to compile and maintain favored, backup and residual traffic lists as well as neighbor list maintenance.

More importantly, the teachings of the present invention may be conveniently implemented in multiple microcell microsystems. Preferably, in this alternative embodiment, the AFP controller will maintain separate backup and residual traffic lists, as well as expand the neighbor list and PSP-POF reporting to include neighboring microcell information. Further, the AFP controller and the AFP scanner(s) should be able to handle verification of all active control channels during ongoing and periodic monitoring of the backup and residual traffic channel frequencies.

Also, in the above-described embodiments, it was assumed that the microsystem operated under IS-136/IS-54B TDMA/AMPs protocols. However, it should be realized that the teachings of the present invention need not be so limited, and in fact these teachings can be applied to IS-541 AMPs, GSM and other narrowband cellular radio systems as long as the macrosystem and microsystem must cooperate in sharing a common operational band. Likewise, the particular operational band which the overlying macrosystem and microsystem 26 utilize, nor the size thereof should be viewed as a limitation on the invention.

While the invention is described above in terms of specific embodiments and associated drawings, those of ordinary skill in the art will recognize that the invention can be practiced in other embodiments as well. It is felt therefore that the invention should not be limited to the disclosed embodiments, but rather should be limited only by the spirit and scope of the appended claims.

What is claimed is:

1. A method for assembling a microsystem neighbor list for a cell-based microsystem operating within an overlying macrosystem, comprising the steps of:
    acquiring a macrosystem neighbor list for the overlying macrosystem;
    determining an available control channel within an operational band of the overlying macrosystem for use by the microsystem;
    designating the available control channel as a preferred member of the microsystem neighbor list and designating all preferred members of the macrosystem neighbor list as non-preferred members of the microsystem neighbor list; and
    broadcasting the microsystem neighbor list within the microsystem via the available control channel.

2. The method of claim 1, wherein the macrosystem neighbor list comprises a macrocell neighbor list issued by a macrocell of the macrosystem, the macrocell being geographically proximate the microsystem.

3. The method of claim 2, wherein the microsystem resides at least partly within a service area of the macrocell.

4. The method of claim 1, wherein said determining step comprises the steps of:
    scanning a first set of candidate channels within the operational band of the overlying macrosystem;
    measuring a signal characteristic for each scanned candidate channel;
    comparing the measured signal characteristics to obtain a second set of candidate channels whose measured signal characteristics do not exceed a tolerance threshold; and
    selecting the available control channel from the second set of scanned candidate channels.

5. The method of claim 4, wherein the signal characteristic is a perceived RSSI measurement.

6. The method of claim 4, wherein the first set of candidate channels comprises any frequency pair defined by the operational band of the overlying macrosystem.

7. The method of claim 4, wherein the first set of candidate channels is selected from a plurality of control channels defined within the operational band of the overlying macrosystem.

8. The method of claim 4, wherein said designating step comprises designating each of the second set of candidate channels as preferred members of the microsystem neighbor list.

9. The method of claim 1, wherein said determining step comprises selecting an available control channel from a set of candidate channels specified by the acquired macrosystem neighbor list.

10. The method of claim 1, wherein
    the microsystem is a PSP-POF compatible microsystem; and wherein said broadcasting step comprises the steps of:
    converting the microsystem neighbor list into a PSP-POF table, all preferred members of the microsystem neighbor list being converted into PSP entries of the PSP-POF table, all non-preferred members of the microsystem neighbor list being converted into POF entries of the PSP-POF table; and
    broadcasting the PSP-POF table to at least one mobile registered on the microsystem via an active one of the preferred members of the microsystem neighbor list.

11. The method of claim 10, wherein the microsystem is an IS-136 compliant cellular microsystem.

12. The method of claim 1, wherein
    the microsystem neighbor list comprises plural preferred members; and wherein the method further comprises the steps of:
    designating a first one of the preferred members of the microsystem neighbor list as an active control channel for the microsystem;
    measuring a signal characteristic of the active control channel;
    determining whether the measured signal characteristic exceeds a predefined error threshold indicating a likelihood of co-channel interference; and
    designating another one of the preferred members of the microsystem neighbor list as the active control channel when it is determined that the measured signal characteristic exceeds the error threshold.

13. The method of claim 12, further comprising the step of removing the first one of the preferred members from the microsystem neighbor list when it is determined that the measured signal characteristic exceeds the error threshold.

14. The method of claim 13, further comprising the steps of:
    determining another available control channel within an operational band of the overlying macrosystem; and
    designating the another available control channel as a preferred member of the microsystem neighbor list.

15. The method of claim 1, further comprising the step of verifying all non-preferred members of the microsystem neighbor list.

16. A frequency planning controller for a cell-based microsystem operating within an overlying macrosystem, comprising:
    means for acquiring a macrosystem neighbor list for the overlying macrosystem;
    means for determining an available control channel within an operational band of the overlying macrosystem for use by the microsystem;
    means for designating the available control channel as a preferred member of a microsystem neighbor list;
    means for designating all preferred members of the macrosystem neighbor list as non-preferred members of the microsystem neighbor list; and means for uploading the microsystem neighbor list to the microsystem.

17. A microsystem, comprising:

the frequency planning controller of claim 16; and a base station responsive to said frequency planning controller uploading means for broadcasting the uploaded microsystem neighbor list within a service area of the microsystem.

18. A computer-readable storage medium tangibly embodying computer-readable program code executable by a computer to perform method steps for assembling a microsystem neighbor list for a cell-based microsystem operating within an overlying macrosystem, said method steps comprising:

acquiring a macrosystem neighbor list for the overlying macrosystem;

determining an available control channel within an operational band of the overlying macrosystem for use by the microsystem;

designating the available control channel as a preferred member of the microsystem neighbor list and designating all preferred members of the macrosystem neighbor list as non-preferred members of the microsystem neighbor list; and directing the microsystem to broadcast the microsystem neighbor list.

* * * * *